(12) United States Patent
Tanimoto (10) Patent No.: US 7,243,128 B2
(45) Date of Patent: Jul. 10, 2007

(54) COMMUNICATION DEVICE FOR GENERATING AN ELECTRONIC EMAIL INCLUDING AN ORIGINAL DOCUMENT AND A REPLY DOCUMENT BASED ON THE CONDITION TO INCLUDE THE REPLY DOCUMENT IN THE ELECTRONIC EMAIL AMONG A PLURALITY OF REPLY DOCUMENTS

(75) Inventor: Yoshifumi Tanimoto, Hirakata (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 863 days.

(21) Appl. No.: 10/409,138

(22) Filed: Apr. 9, 2003

(65) Prior Publication Data

US 2003/0200270 A1   Oct. 23, 2003

(30) Foreign Application Priority Data

Apr. 17, 2002 (JP) .............................. 2002-114623

(51) Int. Cl.
*G06F 15/16* (2006.01)
*G06F 15/173* (2006.01)

(52) U.S. Cl. ................ 709/206; 709/205; 709/207; 709/223; 709/224

(58) Field of Classification Search .................. 705/1; 709/205, 206, 224, 207, 223
See application file for complete search history.

(56) References Cited

U.S. PATENT DOCUMENTS 5,963,913 A * 10/1999 Henneuse et al. .......... 709/205

(Continued)

FOREIGN PATENT DOCUMENTS

JP         06-334686 A     12/1994

(Continued)

OTHER PUBLICATIONS

Notification of Reason(s) for Refusal dated Feb. 1, 2006, issued in corresponding Japanese Patent Application No. 2002-114623.

(Continued)

*Primary Examiner*—Rupal Dharia
*Assistant Examiner*—Quang N. Nguyen
(74) *Attorney, Agent, or Firm*—Westerman, Hattori, Daniels & Adrian, LLP.

(57) ABSTRACT

To provide a communication device which can obtain information necessary at a transmitter without placing a burden on a receiver. The control unit prepares an original document by being scanned by the scanning unit, received by the facsimile communication unit, or received by the network communication unit. By comparing a condition for the above operations and a condition set in the distribution table within the storage unit, it can be determined whether or not there is a destination or a reply document, and the reply document can be specified. When including the reply document in an electronic mail, the electronic mail is formed by including the original document and the specified reply document, and the formed electronic mail is transmitted to the destination from the network communication unit. The reply document can include an indication for handling and processing the document, or an input column for the information necessary at the transmitter. Moreover, the address of the destination can be included in the reply document, and human errors and input works at the receiver can be reduced.

2 Claims, 8 Drawing Sheets

U.S. PATENT DOCUMENTS

| | | | |
|---|---|---|---|
| 6,816,885 B1 * | 11/2004 | Raghunandan | 709/206 |
| 6,874,011 B1 * | 3/2005 | Spielman et al. | 709/206 |
| 2002/0049610 A1 * | 4/2002 | Gropper | 705/1 |
| 2002/0124081 A1 * | 9/2002 | Primm et al. | 709/224 |

FOREIGN PATENT DOCUMENTS

| | | |
|---|---|---|
| JP | 07-264376 A | 10/1995 |
| JP | 10-027141 A | 1/1998 |
| JP | 10-051484 A | 2/1998 |
| JP | 2001-216213 | 8/2001 |
| JP | 2001-216213 A | 8/2001 |
| JP | 2001-334686 A | 12/2001 |
| JP | 2002-091871 A | 3/2002 |
| JP | 2002-099483 A | 4/2002 |

OTHER PUBLICATIONS

Decision of Refusal dated Jul. 19, 2006, issued in corresponding Japanese Patent Application No. 2002-114623.

* cited by examiner

| DISTRIBUTION NO. | DISTRIBUTION CONDITION | DESTINATION OF DISTRIBUTION | REPLY FORM TRANSMISSION |
|---|---|---|---|
| 1 | TSI=075-123-XXXX | mail1@sample,mail2@sample, mail3@sample | ON / FORM NO. 01 |
| 2 | SUB=425784562 | mail4@sample | ON / FORM NO. 02 |
| 3 | SCAN INPUT | mail5@sample | ON / FORM NO. 01 |
| 4 | OTHER THAN ABOVE | administrator@sample | OFF |

FIG. 3

```
<!DOCTYPE HTML PUBLIC
    "-//W3C//DTD HTML 4.0 Transitional//EN">
<HTML lang="ja">
<HEAD>
<META http-equiv="Content-Type"
    content="text/html:charset=Shift_JIS">
<TITLE>sample</TITLE>
</HEAD>
<BODY bgcolor="white">
<H3> DISTRIBUTION TABLE </H3>
<TABLE border="1" cellspacing="1" cellpadding="3">
<TR>
<TD nowrap> DISTRIBUTION NO. </TD>
<TD nowrap> DISTRIBUTION CONDITION </TD>
<TD nowrap> DESTINATION OF DISTRIBUTION </TD>
<TD nowrap> RETURN FORM TRANSMISSION </TD>
<TD nowrap> EDIT </TD>
</TR>
<TR>
<TD nowrap> 1 </TD>
<TD nowrap> TSI=075-123-XXXX </TD>
<TD nowrap> mail1@sample,mail2@sample,mail3@sample </TD>
<TD nowrap> ON / FORM NO. 01 </TD>
<TD nowrap> <A href="helpeml.htm">CHANGE</A> </TD>
</TR>
<TR>
<TD nowrap> 2 </TD>
<TD nowrap> SUB=425784562 </TD>
<TD nowrap> mail4@sample </TD>
<TD nowrap> ON / FORM NO. 02 </TD>
<TD nowrap> <A href="helpeml.htm"> CHANGE </A> </TD>
</TR>
<TR>
<TD nowrap> 3 </TD>
<TD nowrap> OTHER THAN ABOVE </TD>
<TD nowrap> administrator@sample </TD>
<TD nowrap> OFF </TD>
<TD nowrap> <A href="helpeml.htm"> CHANGE </A> </TD>
</TR>
</TABLE>
</BODY>
</HTML>
```

FIG. 4

| DISTRIBUTION NO. | DISTRIBUTION CONDITION | DESTINATION OF DISTRIBUTION | REPLY FORM TRANSMISSION | EDIT |
|---|---|---|---|---|
| 1 | TSI=075-123-XXXX | mail1@sample,mail2@sample, mail3@sample | ON / FORM NO. 01 | CHANGE |
| 2 | SUB=425784562 | mail4@sample | ON / FORM NO. 01 | CHANGE |
| 3 | OTHER THAN ABOVE | administrator@sample | OFF | CHANGE |

```
<!DOCTYPE HTML PUBLIC
    "-//W3C//DTD HTML 4.0 Transitional//EN">
<HTML lang="ja">
<HEAD>
<META http-equiv="Content-Type"
    content="text/html:charset=Shift_JIS">
<META http-equiv="Content-Style-Type"  content="text/css">
<TITLE> sample.htm </TITLE>
</HEAD>
<BODY bgcolor="white">
<H1> RETURN FORM (FORM NO. 01) </H1>
<FORM enctype="multipart/form-data"
    action="mailto:sample@sample.co.jp"  method=POST>
<TABLE border="1"  cellspacing="2"  cellpadding="5">
<TR>
<TD nowrap> BROWSING STATUS </TD>
<TD nowrap>
<INPUT type=checkbox name="inst" value="1"> BROWSED <BR>
<INPUT type=text name="name" size="40" maxlength="40"
    value="PLEASE INPUT NAME OF PERSON IN CHARGE">
</TD>
</TR>
<TR>
<TD nowrap> PROCESSING STATUS </TD>
<TD nowrap>
<INPUT type=checkbox name="inst" value="1"> PROCESSED <BR>
<INPUT type=checkbox name="inst" value="1"> UNPROCESSED <BR>
<INPUT type=text name="name" size="40" maxlength="40"
    value="PLEASE INPUT EXPECTED DATE OF PROCESSING">
</TD>
</TR>
<TR>
<TD nowrap> COMMENT </TD>
<TD nowrap> <INPUT type=text name="name" size="50"
    maxlength="40" value=" "> </TD>
</TR>
<TABLE>
<BR>
<INPUT type=submit value="RETURN">
<INPUT type=reset value="REDO">
</FORM>
</BODY>
</HTML>
```

FIG. 8

RETURN FORM (FORM NO. 01)

| BROWSING STATUS | ☐ BROWSED |
| | PLEASE INPUT NAME OF PERSON IN CHARGE |
| PROCESSING STATUS | ☐ PROCESSED <br> ☐ UNPROCESSED |
| | PLEASE INPUT EXPECTED DATE OF PROCESSING |
| COMMENT | |

[REPLY] [REDO]

COMMUNICATION DEVICE FOR GENERATING AN ELECTRONIC EMAIL INCLUDING AN ORIGINAL DOCUMENT AND A REPLY DOCUMENT BASED ON THE CONDITION TO INCLUDE THE REPLY DOCUMENT IN THE ELECTRONIC EMAIL AMONG A PLURALITY OF REPLY DOCUMENTS

FIELD OF THE INVENTION

The present invention relates to a technology for transmitting a document as electronic mail.

DESCRIPTION OF THE RELATED ART

Accompanying recent developments in network technology, electronic mails are exchanged frequently. Generally, when transmitting an electronic mail, the electronic mail is transmitted to a mail server that is provided within a domain which manages a transmitter. The electronic mail passes through another mail server, and then is distributed to a receiving device. Alternatively, after receiving a request from the receiving device, the mail server at the receiving device side distributes the electronic mail to the receiving device.

Such a transmission process for the electronic mail is carried out only in one direction, and communication is not carried out in both directions. Therefore, information of the receiving device cannot be obtained at the transmission of the electronic mail. There are cases when a fact that the transmitted electronic mail has been received by the receiving device can be confirmed by receiving an electronic mail of acknowledgement. However, other information could not be obtained.

For example, there are cases when it is necessary to receive from the receiving device, a reply mail including a processing status, a comment, or the like for a content of the transmitted electronic mail. In such a case, it was necessary to newly form a reply mail voluntarily at the receiving device, and then to transmit the reply mail. When the destination of the reply mail is the transmitter of the original electronic mail, there are cases that an address of the reply mail is set automatically. When the destination of the reply mail and the transmitter of the original electronic mail are different, it is necessary to set the address of the reply mail. In this case, human errors are prone to occur. For example, there are cases when there is a mistake in the input address. As described above, a burden was placed on the receiving device due to the replying operation of the electronic mail.

SUMMARY OF THE INVENTION

The present invention was made in consideration to the above-described circumstance. It is thus an advantage of the present invention to provide a communication device and a recording medium recording a program for the communication device which can obtain information required at a transmitter without placing a burden on the receiving device.

The communication device of the present invention includes a generation unit which generates an electronic mail including an original document and a reply document. The communication device also includes a transmission unit which transmits the electronic mail generated by the generation unit.

In addition, the communication program for a computer to transmit an electronic mail includes a generation function and a transmission function which are executable by the computer. The generation function is a function for generating an electronic mail including an original document and a reply document. The transmission function has the function of transmitting the electronic mail generated by the generation function.

As described above, by including the reply document in the electronic mail and transmitting the electronic mail, the work load for forming the reply mail at the receiving device can be reduced. In addition, for example, by providing an input column for an information which is desirable to be replied in the reply document, the information which is desirable to be replied can be set at the transmitter. Moreover, an address to which a processing result of the electronic mail is notified can be included in the reply document. Accordingly, human errors such as inputting mistakes in the address at the time of reply can be prevented.

Furthermore, the communication device can include a reception unit which receives information. The original document can be the information received by the reception unit. Accordingly, when relaying the information, it becomes possible to include the reply document in the electronic mail and to distribute as an electronic mail. In this case, the communication device can include a condition holding unit which holds a condition indicating whether or not to include the reply document in the electronic mail. Then, by comparing the condition for the reception by the reception unit and the condition held by the condition holding unit, it can be determined whether or not to include the reply document in the electronic mail.

BRIEF DESCRIPTION OF THE DRAWINGS

FIG. 3 is a view for describing an example of a data for editing the distribution table.

DETAILED DESCRIPTION OF THE PREFERRED EMBODIMENTS

Figure 1:
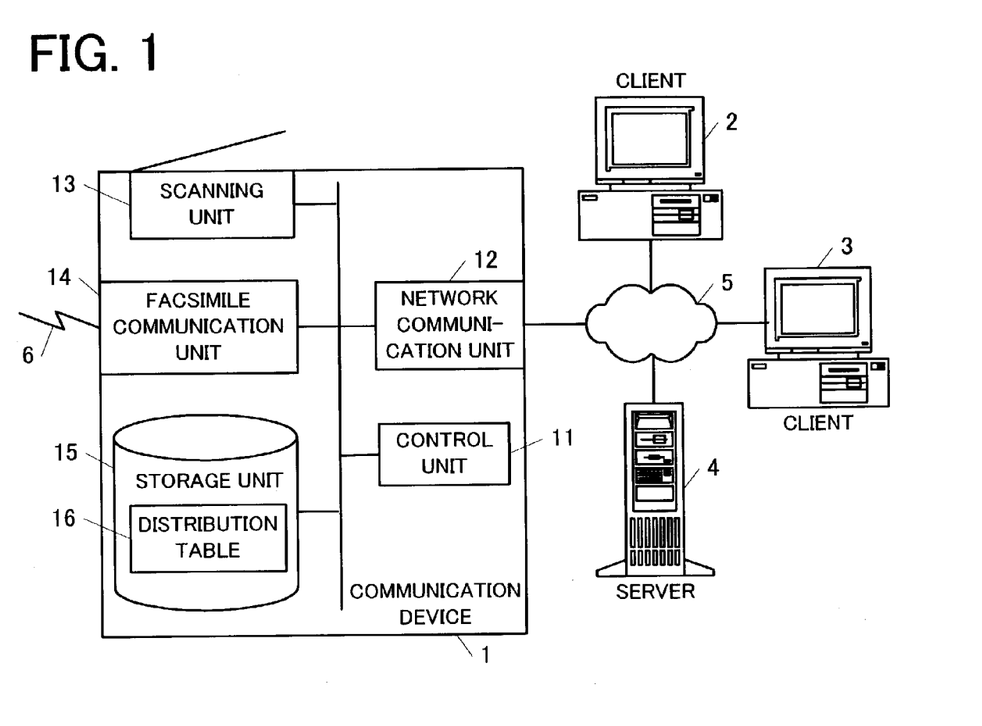
FIG. 1 is a block diagram showing an example of a communication system including a communication device according to an embodiment of the present invention.

FIG. 1 is a block diagram showing an example of a communication system including a communication device according to an embodiment of the present invention. In the drawing, reference number 1 is a communication device, 2, 3 are clients such as personal computers, 4 is a server, 5 is a data exchanging network, 6 is a telephone line, 11 is a control unit, 12 is a network communication unit, 13 is a scanning unit, 14 is a facsimile communication unit, 15 is a storage unit, and 16 is a distribution table.

In the example shown in FIG. 1, the communication device 1, the clients 2, 3, and the server 4 are connected to the data exchanging network 5 such that communications can be carried out. Of course, other various devices (not shown in the drawings) can be connected to the data exchanging network 5. The data exchanging network 5 can be a network of various forms if the network can forward electronic mails. For example, the data exchanging network 5 can be a Local Area Network (LAN) or the Internet.

Communication device 1 is the communication device of the present invention. The communication device 1 includes a function for generating an electronic mail which includes an original document and a reply document. In addition, the communication device 1 includes a function for transmitting the generated electronic mail. In the example shown in FIG. 1, the original document can be an image scanned by the scanning unit 13, a main text or an attached document of the electronic mail received by the network communication unit 12, or a facsimile image received by the facsimile communication unit 14. Moreover, documents other than the document mentioned above can also be the original document. For example, if the communication device 1 includes a function for generating a document, the document generated inside the communication device 1 can be the original document. When the main text or the attached document of the electronic mail received by the network communication unit 12, the facsimile image received by the facsimile communication unit 14 or the like are to be the original document, these documents are to be relayed and distributed.

In the example shown in FIG. 1, the communication device 1 includes the control unit 11, the network communication unit 12, the scanning unit 13, the facsimile communication unit 14, the storage unit 15, or the like.

The control unit 11 controls the entire communication device 1, and has various functions. In particular, the control unit 11 includes the entire or part of the function as a generation unit and a transmission unit. Further, the generation unit is a unit for generating an electronic mail including the original document and the reply document. The transmission unit is a unit for transmitting the generated electronic mail via the network communication unit 12. In the reply document, for example, an input column for information which is desirable to be returned can be provided in the reply document. Alternatively, for example, the reply document can include various information such as an indication for the processing of the original document. Moreover, an address to which the processing result of the transmitted electronic mail is notified can be included in the reply document. As a result, it becomes unnecessary for the receiving device to input the address at the time of reply. Furthermore, when generating and transmitting the electronic mail, the distribution table 16 to be described later on can be referenced, and the destination can be specified by a designation of a distribution condition. In addition, it can be determined whether or not to include the reply document in the electronic mail, and further to include which reply document. Then, in accordance with the determination result, electronic mail can be generated.

The network communication unit 12 carries out communication through the data exchanging network 5. The network communication unit 12 functions as a part of the transmission unit, and includes a function for transmitting an electronic mail formed by the control unit 11. The network communication unit 12 functions as a part of the reception unit. The network communication unit 12 can receive various documents via the data exchanging network 5. These documents can be received in the form of electronic mail, or can be received by other various network protocols.

The scanning unit 13 scans an image on an original. The scanned image can be made as the original document. The scanned image can be transmitted as an electronic mail through the data exchanging network 5. Further, the scanning method or the like can be any method. Moreover, when the scanning function is not provided in the communication device 1, the communication device 1 can be formed without being provided with the scanning unit 13.

The facsimile communication unit 14 carries out facsimile communication with a G3 or G4 facsimile machine at the destination through the telephone line 6 such as a public line or a private line. In particular, the facsimile communication unit 14 functions as a reception unit for carrying out a facsimile reception, or as a part of the reception unit. The received facsimile image can be handled as the original document. Moreover, a telephone number, a subaddress, or other various information of the transmitter can be obtained at the time of the facsimile reception. This information is used when the control unit 11 specifies the destination of the distribution. This information is also used when the control unit 11 determines whether or not to include the reply document in the electronic mail, and further which reply document will be included in the electronic mail. Further, when the facsimile communication function is not provided in the communication device 1, the communication device 1 can be formed without being provided with a facsimile communication unit 14.

The storage unit 15 stores information which is necessary to be stored by the communication device 1. The storage unit 15 is not limited to semiconductor storage device such as a Random Access Memory (RAM) or a Read Only Memory (ROM). The storage unit 15 can be various storage devices such as a hard disk or a removable disk.

The storage unit 15 stores the distribution table 16. The distribution table 16 in the present invention holds at least a condition indicating whether or not to include the reply document in the electronic mail. Here, one table is formed from the above condition and a condition for determining the destination of distribution for distributing the facsimile image received by the facsimile communication unit 14, the image scanned by the scanning unit 13 or the like. This table is the distribution table 16.

Figure 2:
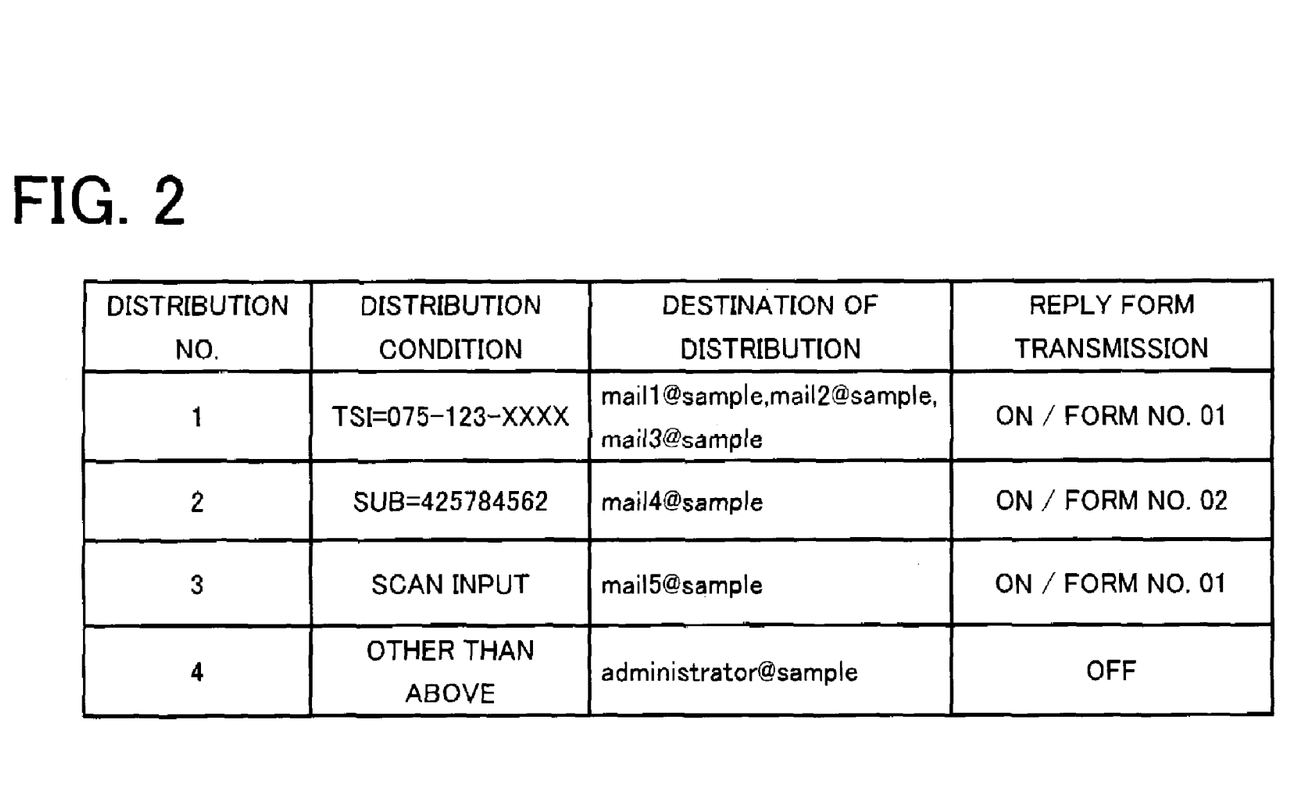
FIG. 2 is a view for describing an example of a distribution table.

FIG. 2 is a view describing an example of the distribution table. In this example, "distribution No." column, "distribution condition" column, "destination of distribution" column, "reply form transmission" column or the like are provided.

The "distribution No." is a consecutive number for each of the distribution conditions.

Various conditions can be set for the "distribution condition". In this example, the condition is set by a Transmitting Subscriber Identification (TSI), a subaddress (SUB) or the like which are received from a calling station during the facsimile communication protocol when receiving a facsimile at the facsimile communication unit 14. Moreover, "scan input", which is a condition indicating a distribution of the image scanned by the scanning unit 13, can be set as shown in the distribution No. "3", or "other than above", which is a condition for when the other conditions are not satisfied, can be set as shown in the distribution No. "4". Of course, other conditions can be set, or various conditions can be set. For example, a partial match can be designated as the condition, or plural conditions can be combined.

An address, which is to be the destination of the electronic mail for when the distribution condition is satisfied, is set in the "destination of distribution" column. Several addresses can be set for the destination of the distribution as shown in the "destination of distribution" column for the distribution No. 1.

The "reply form transmission" column is registered with a determination of whether or not to include the reply document in the electronic mail (ON/OFF), and a determination as to which reply document will be included in the electronic mail in the case the reply document will be included in the electronic mail. Accordingly, a determination for whether or not to include the reply document can be switched according to the destination of the distribution, and the reply document to be transmitted can be selected. Further, in this example, when several addresses are set in the "destination of distribution" column, it is determined whether or not to include the reply document, and which reply document will be included for all of the numerous destination addresses. However, the present invention is not limited to this example. For example, the determination for whether or not to include the reply document, and the setting of the reply document to be included can be carried out for each destination or for each group of destinations among the several destinations.

The distribution table shown in FIG. 2 is just one example, and other various information can be included in the distribution table. Moreover, when the destination of distribution is designated in the facsimile protocol, the "destination of distribution" column is unnecessary. In this case, the distribution condition is used only for the determination of whether or not to send the reply document, and the selection of the reply document to be transmitted. Moreover, when there is one type of the reply document, only the determination indicating whether or not to include the reply document in the electronic mail can be set in the "reply form transmission" column.

The distribution table 16 can be registered and edited from an operation panel (not shown in the drawings) of the communication device 1. In addition, the distribution table 16 can be editable at the client terminal of the manager.

Figure 4:
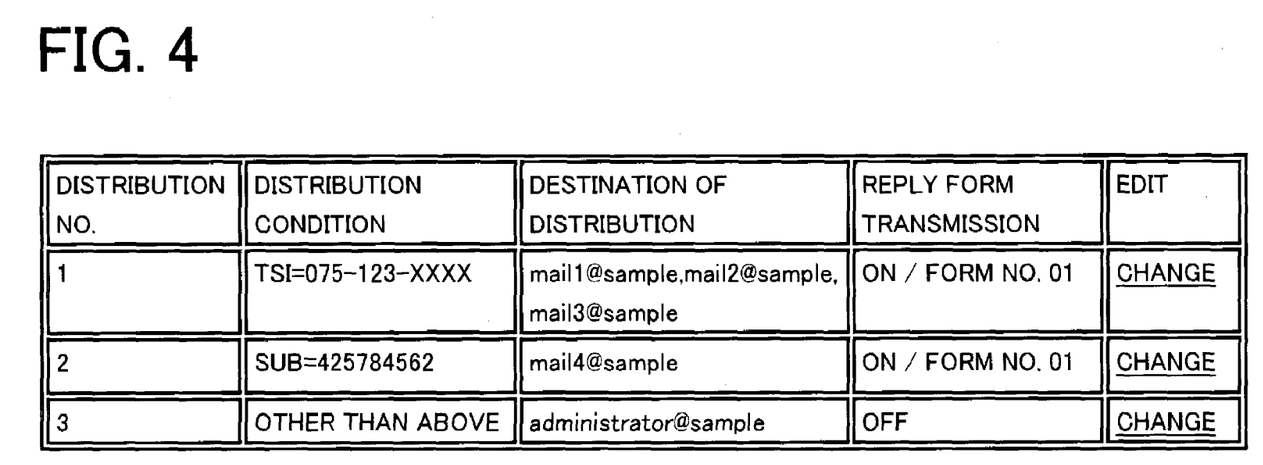
FIG. 4 is a view for describing an example of a display screen of the distribution table at a client terminal for a manager.

FIG. 3 is a view describing an example of the data for editing the distribution table. FIG. 4 is a view describing an example of the display screen of the distribution table at the client terminal for the manager. When editing the distribution table at the client terminal of the manager, for example, a Hyper Text Markup Language (HTML) data as shown in FIG. 3 is forwarded to the client terminal of the manager. Then, the distribution table as shown in FIG. 4 is displayed at the client terminal of the manager. Therefore, after changing the content, "change" in the "edit" column can be indicated. Accordingly, the edited content is returned, and the distribution table 16 is updated. As described above, the distribution table 16 can be edited at remote from the client terminal of the manager.

Figure 5:
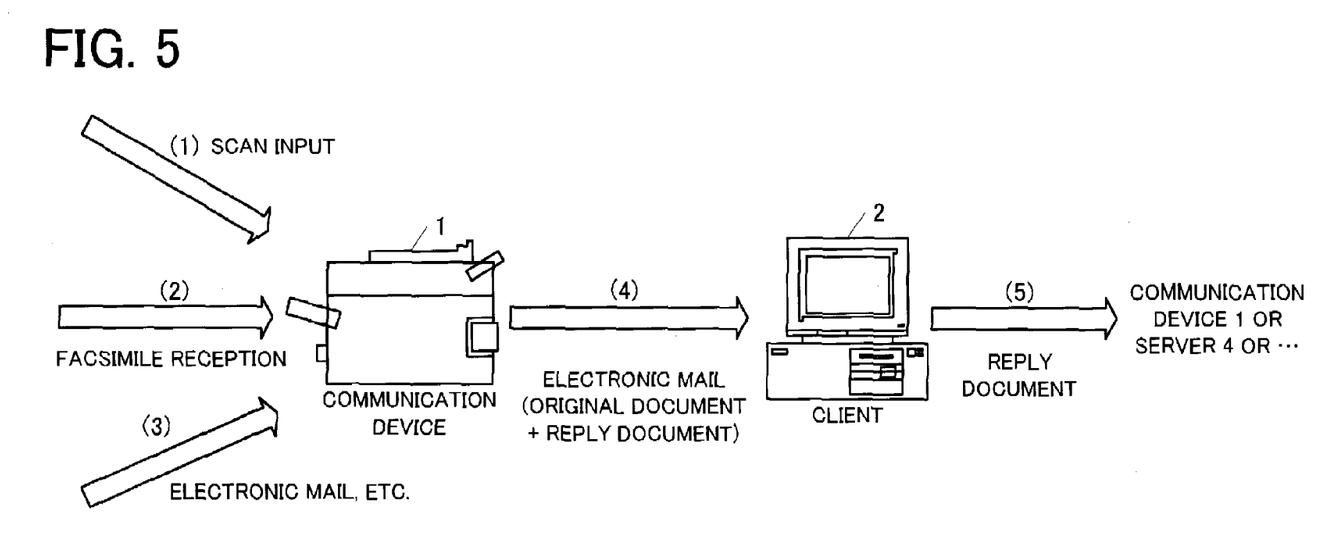
FIG. 5 is a view for describing an example of an operation in the example of the communication system including the communication device according to the embodiment of the present invention.
Figure 6:
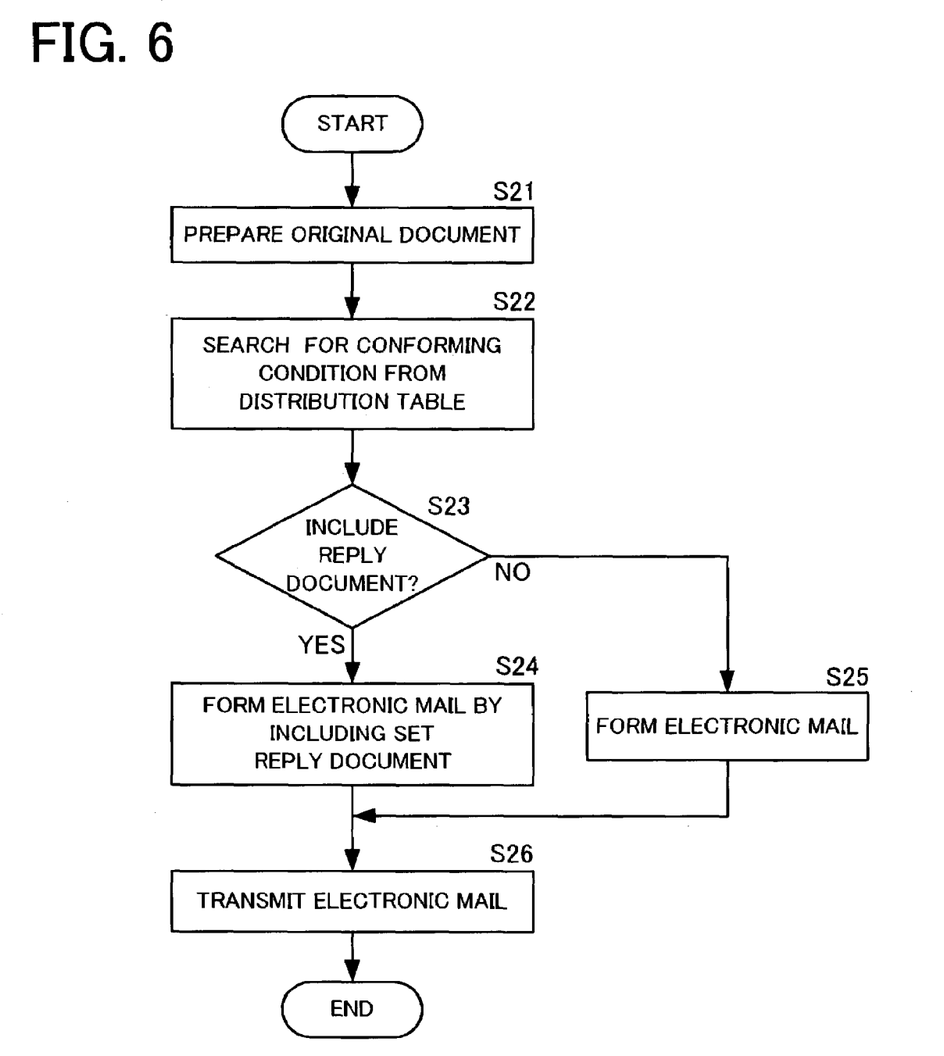
FIG. 6 is a flowchart showing an example of an operation of the communication device according to the embodiment of the present invention.

FIG. 5 is a view describing an example of an operation in an example of a communication system including the communication device according to the embodiment of the present invention. FIG. 6 is a flowchart showing an example of an operation of the communication device according to the embodiment of the present invention. First, in S21 of FIG. 6, the original document is prepared in the communication device 1. The original document can be the image scanned by the scanning unit 13 as shown in (1) of FIG. 5 as an example. Alternatively, the original document can be the image received as the facsimile by the facsimile communication unit 14 as shown in (2) of FIG. 5. The original document can be the electronic mail received by the network communication unit 12, or the information received by other network protocol as shown in (3) of FIG. 5. Moreover, the original document can be the information received by the communication device 1 under another method, or the information formed by the communication device 1.

The control unit 11 of the communication device 1 generates an electronic mail including the original document. In S22, the distribution table 16 stored in the storage unit 15 is referenced, and it is searched for a satisfying condition. Then, the information relating to the corresponding destination or the reply document is obtained. For example, when the original document is the facsimile received image, various pieces of information that can be obtained at the facsimile reception and the distribution condition in the distribution table 16 can be compared. Moreover, it is likewise for the information received by the network communication unit 12, such as the electronic mail. Furthermore, it is likewise for the image scanned by the scanning unit 13, and a satisfying distribution condition such as the distribution condition of "scan input" can be searched. In either case, when other distribution condition is not satisfied, the distribution condition like "other than above" can be satisfied. Alternatively, a default setting can be provided. When a satisfying distribution condition is found including "other than above" or the default distribution condition, the destination and the information relating to the reply document associated with the distribution condition are obtained, and an address of the electronic mail is set for the destination.

Moreover, in S23, it is determined whether or not it is a setting to include the reply document in the electronic mail. When it is the setting to include the reply document in the electronic mail, in S24, an electronic mail is generated by including the original document and the reply document. Further, for the reply document to be included in the electronic mail, the reply document set in the distribution table 16 is selected, and included in the electronic mail. Further, the original document and the reply document can be a format to be attached to the electronic mail, or one of the documents can be made as the main text of the electronic mail. Then, in S26, the electronic mail generated in S24 is transmitted from the network communication unit 12.

When it is determined in S23 that it is a setting to not include the reply document in the electronic mail, in S25, an electronic mail including the original document is generated. Then, in S26, the electronic mail is transmitted from the network communication unit 12. Further, the original document can be attached to the electronic mail, or can be made as the main text of the electronic mail.

As described above, the electronic mail generated by the communication device 1 is distributed to the client (client 2 in FIG. 5) which is the destination, as shown in (4) of FIG. 5. In this case, when the reply document is not included, it is the same as the normal distribution of the electronic mail. When the reply document is included, by displaying the reply document at the client 2, the indication or the request from the communication device 1 is displayed.

Figure 7:
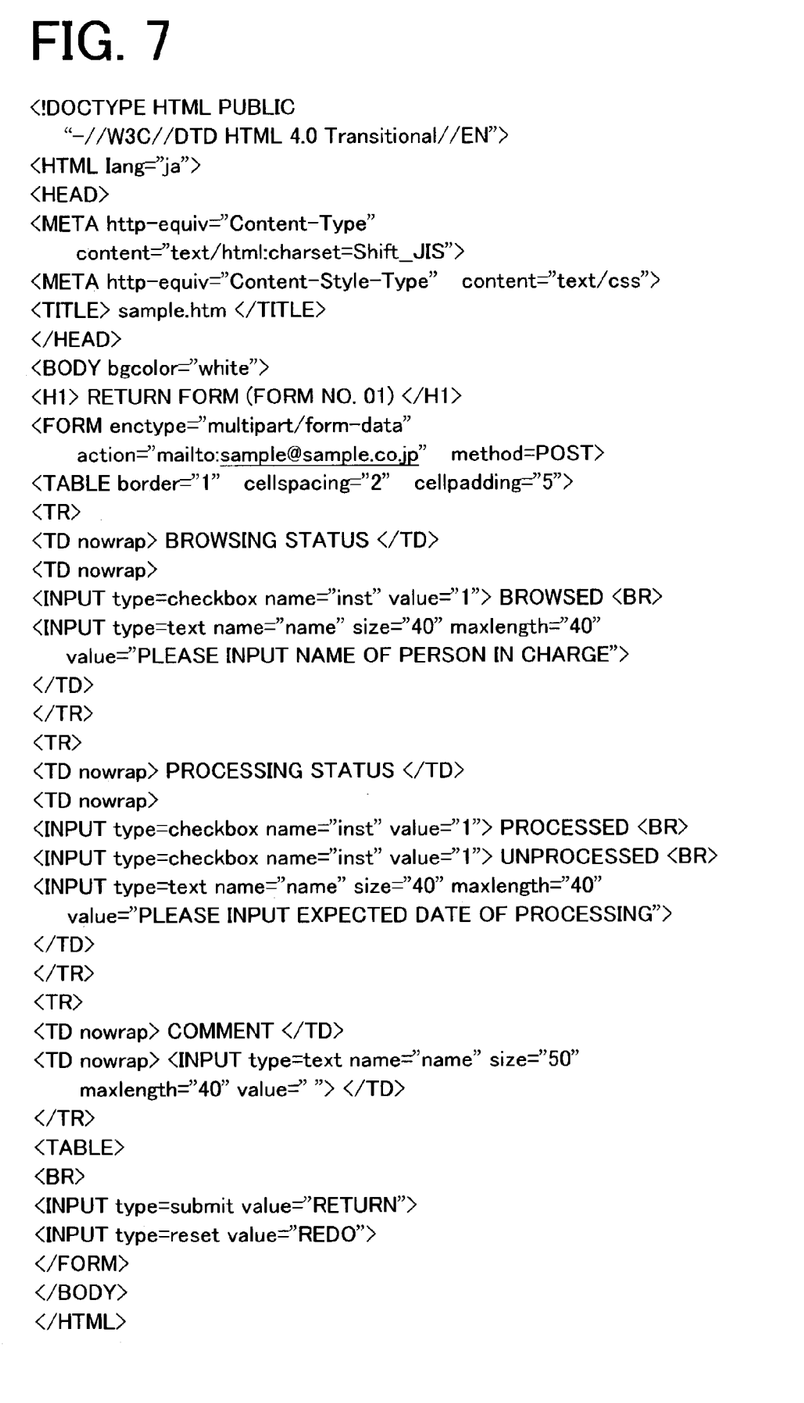
FIG. 7 is a view for describing a specific example of the reply document.
Figure 8:
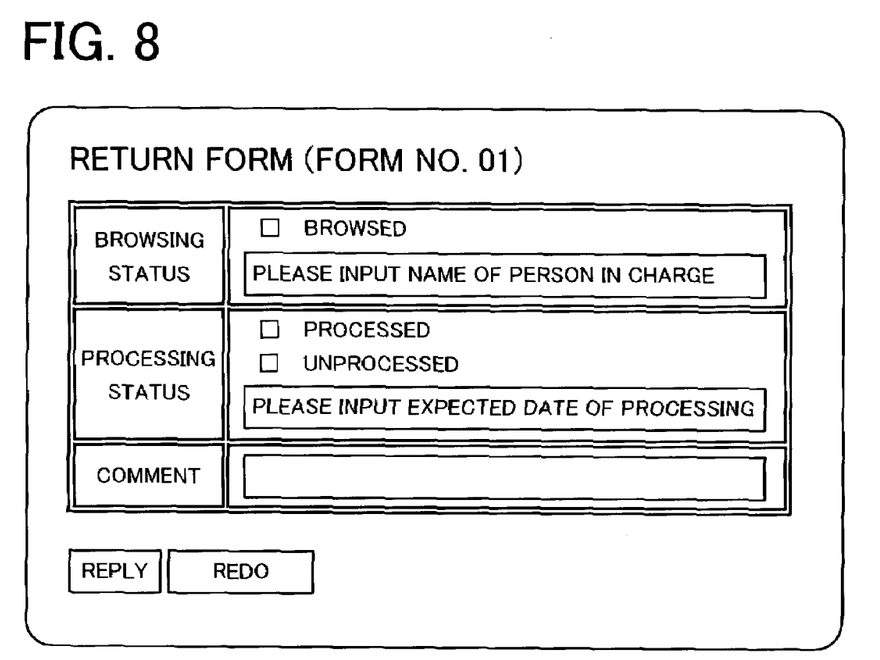
FIG. 8 is a view for describing an example of a display when the specific example of the reply document is displayed.

FIG. 7 is a view for describing a specific example of the reply document. FIG. 8 is a view for describing a display example of the reply document. For example, the reply document described in the HTML as shown in FIG. 7 is attached to the electronic mail, and transmitted. When the attached reply document is displayed at the client 2, the form for reply as shown in FIG. 8 is displayed. Alternatively, when the reply document shown in FIG. 7 is included in the main text of the electronic mail and the electronic mail is transmitted, by opening the electronic mail and referencing the main text of the electronic mail at the client 2, a reply form as shown in FIG. 8 is displayed.

In this example, a browsing status of the document transmitted by the electronic mail, a processing status for the document, or status of the processing indicated by the document, comment, or the like are input and returned.

At the client 2, the reply document is displayed, and after inputting into "browsing status" column, "processing status" column, "comment" column or the like, a "reply" button can be operated. As shown with an underline in FIG. 7, the reply document in this example includes an electronic mail address of the destination. By operating the "reply" button in the example of FIG. 8, the input content is returned as an electronic mail to the electronic mail address of the destination included in the reply document ((5) of FIG. 5).

As described above, the client 2 is not required to carry out an operation to newly form the electronic mail for the reply mail. The client 2 can transmit a reply mail just by inputting into the displayed item, and operating the "reply" button. The content of the reply document can be determined at the communication device 1. Therefore, the transmitting side can receive the necessary information. For example, in the example shown in FIG. 7, a request for returning the browsing status of the document, the processing status of the document, and other comments at the client can be informed to the client. Moreover, an input of the information at the client can be supported, and the processing of the document at the client can be urged.

As described above, an intention of the transmitter can be informed reliably to the receiver, and the information being returned can be controlled at the transmitter of the electronic mail. In addition, since an overview of the information being returned is defined in the reply document, the information being returned can be processed easily.

The destination can be set to be other devices in addition to the communication device 1. For example, by including the address of the server 4 shown in FIG. 1, the information input into the reply document can be forwarded to the server 4. Accordingly, the server 4 can execute various processing based on the information input to the reply document, or manage the input information.

In either case, by including the destination in the reply document, human errors such as a mistake in the address can be prevented from occurring at the time of reply from the client, and the reply mail can be transmitted reliably. Moreover, the transmitter of the original document can set the destination for the reply mail.

Moreover, the reply mail is not limited to an electronic mail. For example, a Uniform Resource Locator (URL) can be described in the reply document, and the content input in relation to the URL can be transmitted by a Hyper Text Transfer Protocol (HTTP). Furthermore, other protocols can be used. The description of the reply document is not limited to the HTTP. For example, the description can be a Portable Document Format (PDF) or other format.

Of course, the content of the reply document is not limited to the examples shown in FIG. 7 and FIG. 8. By preparing the input columns as in these examples, the return of the necessary information can be received reliably, and the work load at the receiver can be reduced. Moreover, various contents can be included in addition to the items which are necessary to be input at the client. For example, notices for handling the document included in the electronic mail can be made as the reply document. For example, even with the reply document which does not include the input column, by operating the "reply" button, it can be assumed that the notices have been approved. Furthermore, it can be constructed such that script, macro or the like can be executed for obtaining the information of the client. Therefore, by changing the content of the reply document, the reply document becomes capable of being used for various purposes.

In the communication device according to the embodiment of the present invention shown in FIG. 1, the scanning unit 13, the facsimile communication unit 14 or the like are provided, and the communication device could relay and forward. However, the present invention is not limited to this example. For example, the communication device 1 can also be the client terminal or the like which is the same as the clients 2 and 3. Also in this case, when transmitting an electronic mail, the reply document can be included and transmitted, and an indication for the document can be carried out to the receiver. In addition, it can be urged to obtain and input the information that is necessary at the transmitter, and then a reply mail can be received.

What is claimed is:

1. A communication device, comprising:
   a storing unit for storing a distribution table;
   a generation unit for generating an electronic mail including an original document and a reply document;
   a transmission unit for transmitting the electronic mail generated by the generation unit;
   a reception unit for receiving information; and
   the distribution table for holding a condition to include a selected reply document in the electronic mail among a plurality of reply documents;
   wherein the original document is the information received by the reception unit, and
   wherein the generation unit determines whether or not to include the reply document in the electronic mail by comparing a condition from a reception by the reception unit and the condition held by the distribution table.

2. The communication device according to claim 1, further comprising:
   an updating unit for updating the condition held by the distribution table.

* * * * *